Oct. 1, 1957 L. A. WEBER 2,808,464

CARRIER RINGING CIRCUIT

Filed Dec. 20, 1955 3 Sheets-Sheet 1

INVENTOR
L. A. WEBER
BY [signature]
ATTORNEY

Oct. 1, 1957 L. A. WEBER 2,808,464
CARRIER RINGING CIRCUIT
Filed Dec. 20, 1955 3 Sheets-Sheet 2

BLOCK DIAGRAM OF TELECALLER GENERATOR

INVENTOR
L. A. WEBER
BY
ATTORNEY

Oct. 1, 1957 L. A. WEBER 2,808,464

CARRIER RINGING CIRCUIT

Filed Dec. 20, 1955

3 Sheets-Sheet 3

INVENTOR
L. A. WEBER
BY [signature]
ATTORNEY

United States Patent Office 2,808,464

Patented Oct. 1, 1957

2,808,464

CARRIER RINGING CIRCUIT

Laurance A. Weber, Livingston, N. J., assignor to Bell Telephone Laboratories, Incorporated, New York, N. Y., a corporation of New York Application December 20, 1955, Serial No. 554,193

6 Claims. (Cl. 179—87)

This invention relates to a carrier telephony system and more particularly to a carrier telephony system in which the ringers in the called subscriber subsets have been replaced by horn-type transducers which respond to tone signals transmitted over the carrier system.

In the carrier telephony systems of the prior art, the called subscriber subsets are of the conventional type in which the ringer responds to the usual 20-cycle ringing current which is generated, or reconstructed, at the receiving end of the carrier system in response to the reception of the tone signals transmitted from the central office. The generating equipment at the receiving end is necessary because ringing current cannot be directly transmitted over the carrier with sufficient power to energize conventional ringers.

Systems of this type are far from ideal because of the high cost of the equipment needed for reconstructing the 20-cycle ringing current. This equipment includes receiving apparatus responsive to tone signals transmitted over the carrier; apparatus for producing the 20-cycle ringing current, such as a motor generator or an interrupter; and a source of current sufficient to power the generating equipment. It obviously would be a significant step forward in the art if a carrier system could be developed which would eliminate the need for the reconstruction equipment and which would directly ring the called subscriber by means of the signals transmitted over the carrier.

It is an object of the invention to provide a carrier telephony system in which the ringers in the called party subsets have been replaced by horn-type transducers that respond directly to tone signals transmitted over the carrier channel.

It is a further object of the invention to provide a carrier telephony system which contains no equipment at the receiving end for converting carrier frequency signals to ringing current signals.

It is a further object of the invention to provide a carrier telephony system in which the alerting mechanisms in the called party subsets are actuated directly from signals transmitted over the carrier.

It is a further object of the invention to provide a carrier telephony system in which one of a plurality of called party subsets on the same metallic line can be selectively actuated directly from a signal transmitted over the carrier system.

This invention discloses a carrier system in which a horn-type transducer in a called party subset is energized directly from a signal transmitted over the carrier without the necessity of any intervening reconstruction equipment.

The subset and its transducer disclosed herein form no part of the present invention and may be of any type suitable for the purpose. Advantageously, they may be of the type shown in either the copending application of L. A. Meacham, Serial No. 469,802, filed November 18, 1954, or the copending application entitled L. A. Meacham et al. Serial No. 469,633, filed November 18, 1954.

Upon the initiation of a call, an interrupted audio frequency signal is generated at the carrier transmitter and is transmitted over the carrier at a modulated carrier frequency in response to the application of ringing current by the central office to the input line of the carrier. The modulated signal transmitted over the carrier channel is demodulated at the receiving end where the resultant interrupted audio frequency signal is applied to the called subscriber line.

The application of this interrupted signal to the line energizes the horn-type transducer in the called subscriber subset to announce the presence of an incoming call on the line. The transducer, which in telephone circles is called a telecaller, is sufficiently sensitive and sufficiently efficient to produce an interrupted audible tone of loud volume when energized.

The present invention also provides a means by which the transducer in a party line subset can be selectively energized by means of a signal transmitted over the carrier in response to the application of ringing current to the central office appearance of the desired called subscriber. In an arrangement of this type, all subscribers on the same line may either have the same appearance or, each have an individual appearance in the central office. The result is the same in any event since, even if each party-line subscriber has an individual appearance, all the appearances are multipled together and are connected to the carrier equipment by a single line.

The central office, upon the receipt of a call destined for a particular carrier party line subscriber, applies a selected type of ringing current to the input line of the carrier in accordance with the particular party now being called. The ringing currents associated with the various subscribers may differ from each other in frequency, they may differ from each other in the polarity of direct current superimposition and in the manner in which they are connected to the line, or they may differ from each other in any manner suitable for the purpose. In the present disclosure, the various ringing currents emanating from the central office differ from each other in a manner in which they are applied to the carrier input line.

The carrier equipment, upon receiving the ringing current associated with and peculiar to the called subscriber, generates an interrupted audio frequency signal whose frequency is also peculiar to the called subscriber. This interrupted audio frequency signal is applied to the carrier transmitter and is there converted to a modulated radio frequency signal.

Equipment at the receiving end of the carrier channel demodulates the radio frequency signal and applies the resulting interrupted audio frequency signal to the called subscriber's party line. Each subscriber's subset contains a frequency selective filter that will pass currents only of the frequency associated with its subset and, therefore, only the transducer of the desired party's subset is energized when the audio frequency signal is applied to the party line. The tone generated by the horn-type transducer notifies the subscriber that an incoming call intended for him is now on the line.

It is a feature of the invention to provide a sensitive horn-type transducer as an alerting means, instead of the conventional ringer, in subscribers' subsets so that the transducer may be actuated directly by the demodulated signals from the output of the carrier receiver.

It is a further feature of the invention to provide each subset on a party line with a frequency selective filter and a sensitive horn-type transducer so that only the transducer in a particular subset may be actuated when there is applied to the line an audio frequency signal of the frequency to which the filter in the desired subset is tuned.

It is a further feature of the invention to provide a circuit which modulates a carrier with a selected one of a plurality of interrupted audio frequency signals, each of which is of a frequency exclusive to a different called subscriber.

It is a further feature of the invention to provide a circuit which selectively generates one of a plurality of interrupted audio frequency signals under control of the type of ringing current applied thereto.

It is a further feature of the invention to provide a circuit which, upon the reception of conventional ringing current thereat, generates an interrupted audio frequency signal for transmission over a carrier channel to energize an alarm means in a called subscriber's subset.

A preferred exemplary embodiment of the invention is shown on the accompanying drawings in which.

Figure 1:
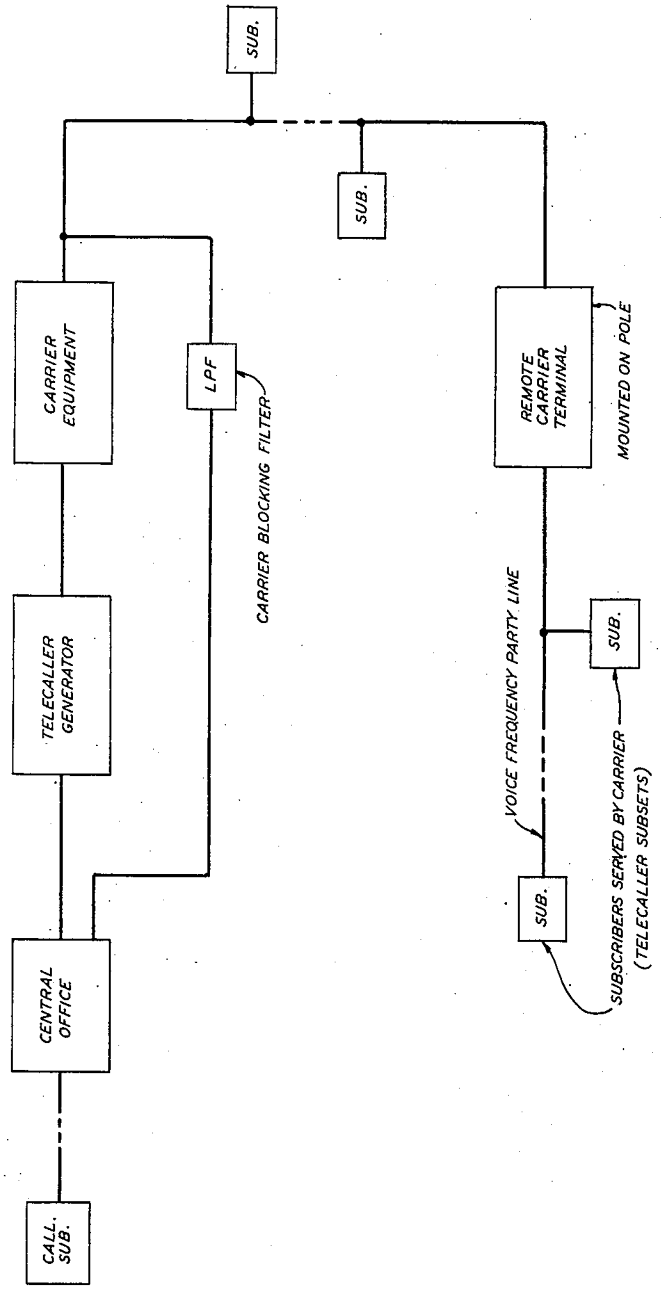
Fig. 1 is a diagrammatic showing of an entire telephone system of which the present invention is a part.

In the upper left corner of Fig. 1 a calling subscriber's subset is shown connected to a central office which may be either a manual or a dial office of any of the well-known types. The particularl type of calling subscriber's subset used and the particular type of central office used are of no consequence to the present invention.

When the calling subscriber initiates a call intended for a subscriber on a carrier party line, a circuit is completed from the calling line, through the central office, whether it be of the manual or of the automatic type, to the central office appearance of the called line. Upon the completion of this connection, ringing equipment at the central office selectively applies ringing current to the called line to which is connected the telecaller generator shown in diagrammatic form in Fig. 1 and in a more detailed form in Figs 2 and 3.

When the telecaller generator receives ringing current of a type peculiar to the called subscriber, it generates an interrupted audio signal of a frequency also peculiar to the desired called party line subscriber. This interrupted audio frequency signal is applied to the carrier equipment shown in Fig. 1 in block diagrammatic form and which may be of any type suitable for the purpose since the details thereof are of no consequence to the present invention. If desired, it could be of the type shown in the V. J. Hawks et al. application, Serial No. 455,099, filed September 10, 1954, or may be of the type shown in the D. C. Weller application, Serial No. 455,129, filed September 10, 1954, now Patent 2,763,726, granted September 18, 1956.

At the carrier the interrupted audio frequency signal is converted to a modulated radio frequency wave and is transmitted over the system to the carrier receiver contained in the box designated "carrier remote terminal" in Fig. 1. The exact details of this equipment are of no concern to the present invention and may, if desired, be of the type shown in the aforementioned V. J. Hawks et al. application and D. C. Weller patent.

The radio frequency wave applied to the carrier receiver is demodulated and the resultant interrupted audio frequency signal is carried over the party line and applied to each subset thereon. Each subset contains a frequency selective filter and is tuned to a frequency exclusively associated therewith. The frequency to which each filter is adjusted matches the frequency generated by the telecaller generator upon the reception of a call intended for a particular subscriber so that only the filter in the desired subscriber's subset passes the audio frequency signal now applied to the line. After this signal passes through the filter, it is applied to an efficient horn-type transducer which generates a loud interrupted audible signal to notify the subscriber that a call awaits him. When he lifts his receiver to answer the call, the transducer is short-circuited, the telecaller generator is disabled, and normal conversation may take place.

The horn-type transducers are actuated directly from the signals transmitted over the carrier and, therefore, the equipment at the receiving end of the carrier may be greatly simplified over that which has been required heretofore. In the carrier systems of the prior art, the subscriber subsets were provided with conventional-type ringers, which were actuated by 20-cycle ringing current. The 20-cycle ringing current was generated, or reconstructed by, equipment associated with the carrier receiver in response to the reception thereat of certain types of signals from the carrier transmitter. This equipment was bulky because it had to supply a considerable quantity of ringing current over the line to the called subsets. It was also bulky because a large power supply, such as a battery, was needed to power the equipment.

The receiving equipment in the present system is greatly simplified since the transducers are directly energized from the signals transmitted over the carrier and, therefore, the bulky and expensive equipment needed heretofore to reconstruct the 20-cycle ringing current is no longer required. This innovation reduces the power supply requirements with the result that the receiving end equipment now need only comprise a small transistor receiver together with a suitable power supply.

Two subscriber stations are shown connected to the line interconnecting the carrier equipment and the carrier remote terminal. These subscribers do not receive their calls over the carrier equipment but instead, they receive them directly from the central office by means of the carrier blocking filter shown on Fig. 1. This is a low-pass filter by means of which the central office can apply normal speech currents to the same wires that carry carrier frequency signals. This expedient allows the same pair of wires simultaneously to be used for the transmission of carrier frequencies and audio frequencies. These two subscribers have a central office appearance separate from that of the subscribers on the carrier party line and, therefore, calls intended for these two subscribers will be directed by the central office to their appearance and will pass through the low-pass filter to their line. The presence of both carrier frequencies and speech frequencies on the same line at the same time causes no deleterious interaction and, therefore, simultaneous conversations by a subscriber on the carrier line and by a subscriber on the noncarrier line may take place.

Figure 2:
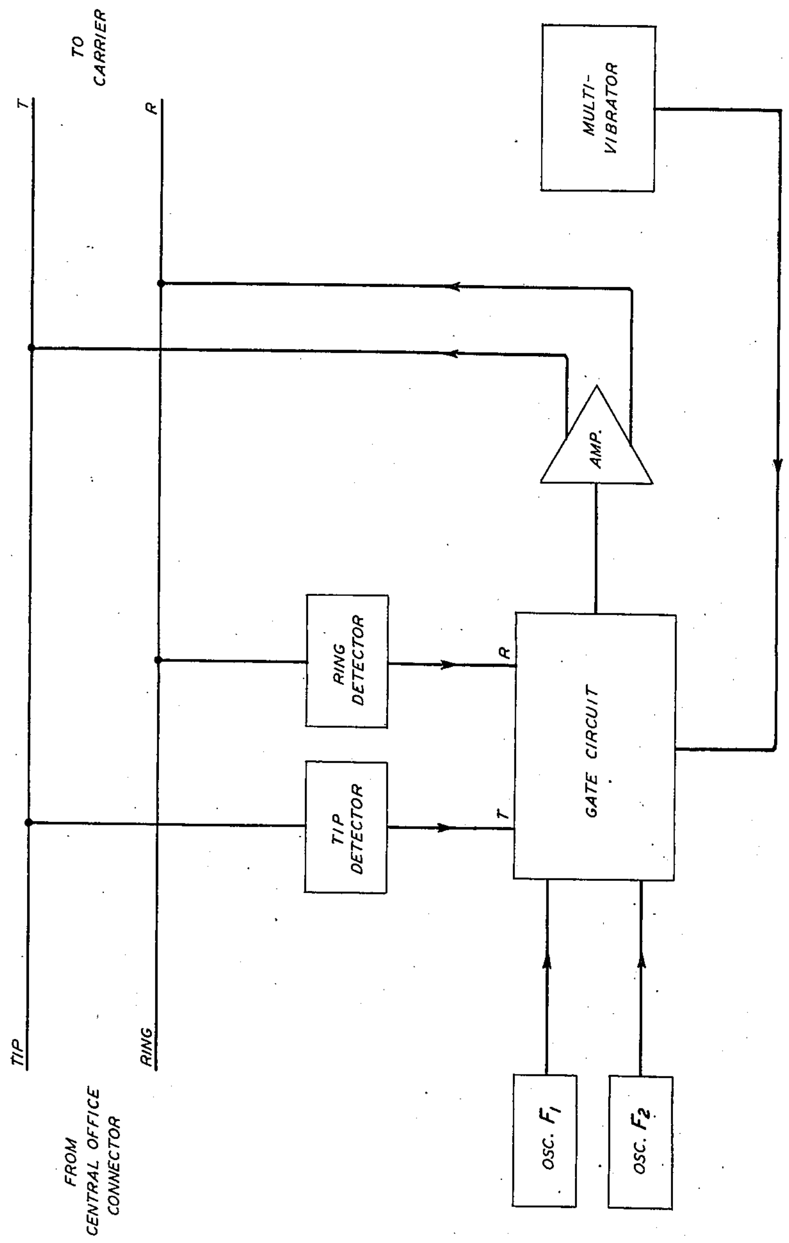
Fig. 2 is a diagrammatic showing of the telecaller generator contained in the system shown in Fig. 1.

Fig. 2 illustrates, in block diagram form, the individual components of the telecaller generator shown in Fig. 1. The tip and ring wires shown in the top of Fig. 2 extend from the central office appearance of the party line to the carrier transmitter. The components shown in the lower portion of Fig. 2 are arranged to provide carrier signaling for a called two-party line. This showing is merely exemplary and, if desired, the components shown in Fig. 2, as well as the circuit shown in Fig. 3, could have been arranged to provide carrier signaling of either a single party line or of a party line having a number of stations greater than two.

In the arrangement of Fig. 2, ringing current is supplied to either the tip or ring lead depending upon which one of the subscribers on the two-party line is being called, and, therefore, a called party can be said to be associated with either the tip or the ring lead. If the subscriber associated with the tip lead is being called, ringing current is supplied between ground and the tip lead. The tip detector detects the presence of ringing current on the tip lead and closes a path to energize the oscillator F1 which generates an audio signal of frequency F1. The energized oscillator applies its output to the gate circuit which is of the type that permits an input signal to pass to the amplifier only during the coincidence of both an input signal from either one of the oscillators, F1 or F2, and an input signal from the multivibrator, which is of the free-running type and which is adjusted to produce a 14-cycle square-wave output. The simultaneous application of the multivibrator output and the oscillator F1 output to the gate circuit causes it to apply to the amplifier a signal of frequency F1 interrupted 14 times a second.

This interrupted signal is amplified and applied to the carrier transmitter by means of the tip and ring leads. The transmitter transmits this interrupted audio frequency signal at a carrier frequency over the transmission line to the carrier receiver where it is demodulated and applied to the called party line to energize the transducer in the called party's subset. The transducer in the other party's subset does not respond to this signal of frequency F1 because the frequency selective filter therein is adjusted to pass only the frequency F2.

It has just been described how a carrier subscriber is called when ringing current is applied to the tip lead by the central office. The operation would have been similar if ringing current had been applied to the ring lead. In this case the ring detector would have caused the oscillator F2 to operate and apply a signal of frequency F2 to the gate circuit. The signal would then have been interrupted by the multivibrator, amplified by the amplifier, and applied to the carrier transmitter in a manner similar to that already described. Upon reception of this frequency by the carrier receiver and the application thereof to the line, the transducer in the other party's subset would have been energized.

Figure 3:
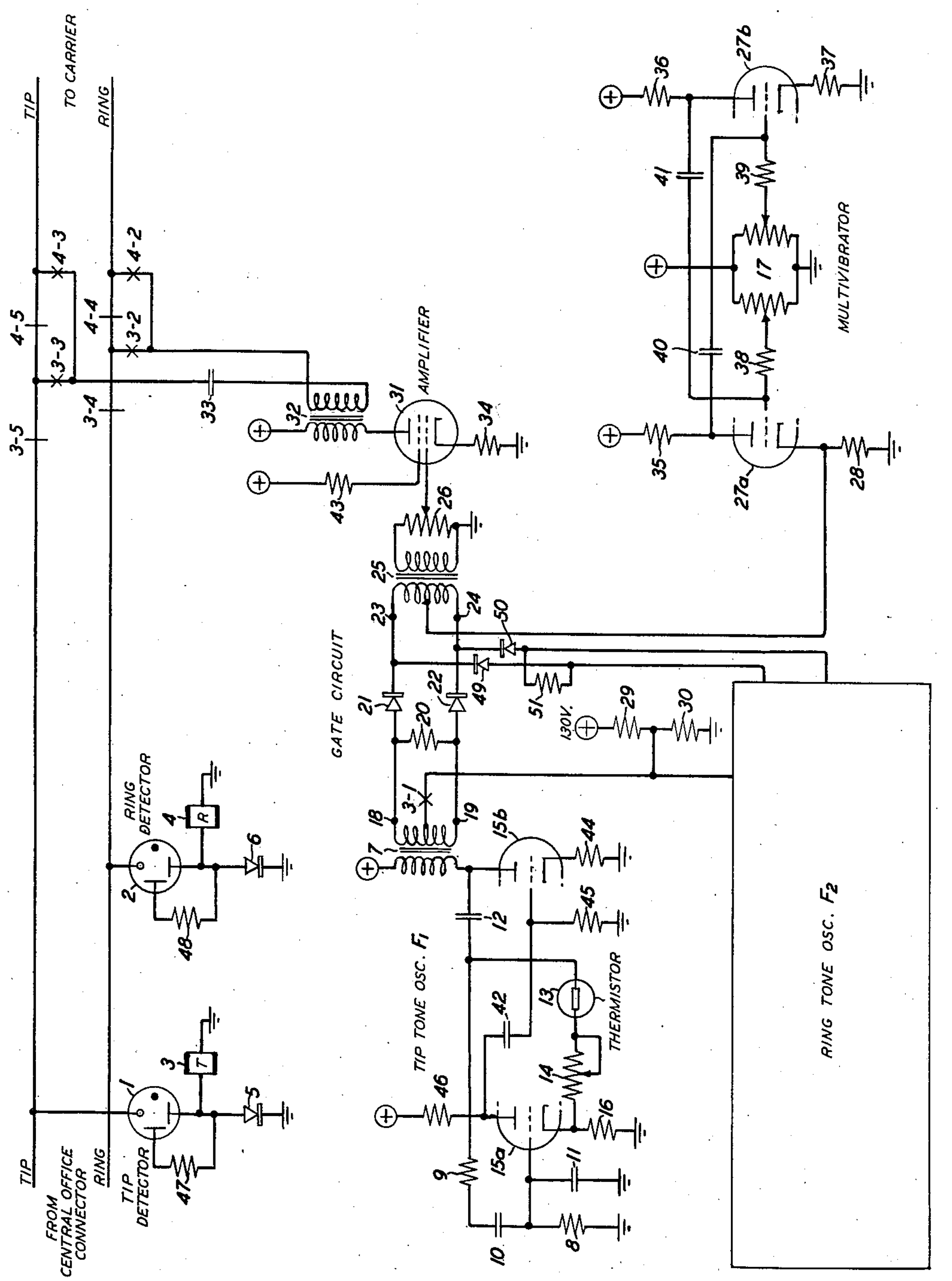
Fig. 3 is the circuit of the telecaller generator.

The following description is made with reference to Fig. 3 which shows the circuit of the telecaller generator. In response to the initiation of a call and, depending upon which subscriber is being called, the central office applies ringing current to either the tip or ring lead which, in turn, energizes the gas tube and the relay associated therewith. Tube 1 is connected in series with relay 3 and this combination is, in turn, connected between the tip lead and ground. Tube 2 is connected in series with relay 4 between ground and the ring conductor. These tubes are three-element gas tubes and may be of any type suitable for the purpose, such as a Western Electric type 426A. The tubes are connected in such a manner that each conducts during the negative half cycle of the 20-cycle ringing frequency applied to its associated lead. This causes a pulsating current to flow through the gas tube to operate its associated relay. Varistors 5 and 6 are connected from the junction of tube 1 and relay 3, and the junction of tube 2 and relay 4, to ground, respectively, in order to prevent the relays from buzzing at a 20-cycle frequency when their associated gas tube conducts. The varistors permit a more continuous current to flow through the relay by virtue of its winding inductance.

Assuming that the calling party is attempting to establish a connection with the called party whose ringing mechanism is associated with the tip lead, the central office applies ringing current between the ground and the tip lead to energize gas tube 1 and to operate relay 3. This ringing current is not continuous and is applied for two seconds every six seconds. This is more commonly known as a two-on four-off cycle. Relay 3 (as well as relay 4) is of the nonlocking type and therefore it follows the ringing current and is operated for two seconds and unoperated for four seconds during each six-second cycle. Each operation of relay 3 closes its contacts 3–1 which, in turn, close a circuit to apply the output of the tip-tone oscillator to the gate circuit through transformer 7.

The tip-tone oscillator is of the conventional Wien bridge type in which frequency determining elements are resistors 8 and 9 and condensers 10 and 11. The two triodes **15*a* and 15*b* are interconnected so that triode 15*b* amplifies the output of triode 15*a* and positively feeds back a portion of its output signal through condenser 12, resistor 9, and condenser 10 to the grid of triode 15*a*. This circuit provides a sufficient amount of positive feedback to maintain oscillation. Thermistor 13, potentiometer 14, condenser 12, and resistor 16 comprise a circuit in which the output of triode 15*b* is connected to the cathode of triode 15*a* to provide a small amount of negative feedback. The quantity of negative feedback applied is controlled by potentiometer 14 and it is adjusted to the point where the harmonic output of the oscillator is minimized. Thermistor 13** varies its resistance in response to temperature changes to keep the amplitude of oscillations constant during changes in battery voltage, changes in vacuum tube characteristics, and changes in temperature. Upon an increase in oscillator output more voltage appears across the thermistor which increases its temperature and, thus, drops its resistance to provide more negative feedback in order to decrease the oscillator output. Conversely, if the output of the oscillator decreases, the temperature of the thermistor decreases which increases its resistance and thus decreases the quantity of negative feedback applied to cause the oscillator output to increase. This arrangement insures that the oscillator output will remain relatively constant in amplitude and relatively free of harmonics.

The plate current of triode **15*b* is supplied through the primary of transformer 7 and, therefore, the output of the oscillator is continuously applied to terminals 18 and 19** on the secondary of the transformer.

The ring-tone oscillator, which is shown in diagrammatic form only, is identical in all respects to the tip-tone oscillator except that its frequency is different. The output of this oscillator is applied to the gate circuit comprising elements 49, 50, and 51 whenever relay 4 is operated in response to the application of ringing current to the ring lead. At this time contacts 4–1, not shown, are closed to apply a positive potential from voltage dividers 29 and 30 to the secondary of the output transformer for this oscillator in a manner identical to that described in connection with the tip-tone oscillator.

The pulse generator shown on Fig. 3 comprises a symmetrical multivibrator of the type well known in the art the frequency of which is controlled by the setting of the dual potentiometer 17. The symmetry of the output wave is insured by virtue of potentiometer 17 having a common control shaft since it is the effective bias on the grid of each tube which determines its conduction cycle and hence, the frequency of the circuit. Since the grid of both triodes **27*a* and 27*b* are always at the same potential with respect to each other, the voltage output across cathode resistor 28 should be a symmetrical square wave. The frequency is adjusted by varying potentiometer 17** until a pleasing tone is obtained in the transducers. Experience has shown that the optimum frequency of the multivibrator, as determined by consumer preference, is 14 cycles per second.

The output of the multivibrator is continuously applied from resistor 28 to the center tap on the primary of transformer 25. At the same time the output of the tip-tone oscillator is continuously applied to the secondary of transformer 7. Each time relay 3 is operated for two seconds in response to the reception of ringing current, the center tap of the secondary of transformer 7 is closed through contacts 3–1 of relay 3 to a positive source of potential on the network comprising relays 29 and 20. At the same time, the alternating current output from the oscillator is superimposed upon the aforementioned direct current potential and the resultant potential is applied to the left side of diodes 21 and 22.

The amplitude of the square-wave output from multivibrator is such that a high positive potential appears across resistor 28 during the conduction cycle of triode **27*a*. This potential is applied through the primary of transformer 25 to the right-hand side of diodes 21 and 22** to render them nonconducting. This potential on the right-hand side of the diodes is greater than the positive bias on their left-hand side as applied from the voltage divider and, therefore, they are rendered nonconducting in spite of the alternating current output from the oscillator now superimposed on them since this alternating current potential is small in comparison with direct current biases involved. It is, therefore, unable to overcome the bias applied by resistor 28 and, hence, the oscillator output is not applied to transformer 25 when triode 27*a* conducts.

The voltage across resistor 28 is very small during the nonconduction periods of triode 27*a* and hence, the center tap of the primary of transformer 25 and the right-hand side of diodes 21 and 22 are practically at ground potential at this time. The diodes are now rendered conducting and the alternating current output from the oscillator is passed through them and is applied through the primary of transformer 25. This action is repeated for each cycle of the multivibrator and, therefore, the oscillator output is applied to transformer 25 and to potentiometer 26 whenever triode 27*a* is nonconducting.

Each time relay 3 is operated for two seconds in response to the application of ringing current to the tip lead, this interrupted audio frequency signal of frequency F1 is applied to the grid of amplifier tube 31 wherein it is amplified and applied to the primary of transformer 32. The signal induced in the secondary of the transformer 32 is fed through condenser 33 and through the closed contacts 3–2 and 3–3 of operated relay 3 to the tip and ring leads. The signal is carried over these leads to the carrier transmitter wherein it is converted to a modulated radio frequency wave and is transmitted over the carrier channel to the receiving end equipment. At the receiving end, the signal is demodulated and the resultant interrupted audio frequency signal is applied to the line to energize the transducer in the called party's subset in a manner hereinbefore described. The signal applied to the transducer has a duty cycle identical to that of the original ringing current and therefore, the transducer emits a loud audible tone for two seconds and is quiet for four seconds.

This signal is applied to the transducer until the called party lifts the receiver on his subset. At this time, a relay operates in the carrier transmitter, in response to the answering of the call by the called subscriber to bridge the tip and ring leads with a low direct current impedance. If the subscriber answers during the two-second ringing interval no further action immediately takes place and the ringing continues until the end of the two-second cycle since the operation of relay 3 operates its contacts 3–5 and 3–4 which disconnect the central office from the carrier transmitter.

At the end of the two-second ringing interval, or if the subscriber answers during the four-second quiet interval, relay 3 releases which recloses its contacts 3–4 and 3–5 to reconnect the central office and the carrier transmitter. The reclosure of this circuit permits the aforementioned direct current shunt to trip the ringing in the central office. The tripping of the ringing relay disconnects the ringing circuit and connects the talking circuit to the line.

It has just been described how a call is completed when ringing current is applied to the tip lead by the central office. The operation would be similar if it were desired to call the other party on the line by applying ringing current to the ring lead. In this case the ring-tone oscillator, instead of the tip-tone oscillator, would have had its output connected to the gate circuit and interrupted by the multivibrator. This resultant frequency would then be applied over the carrier system to the proper party's subset in a manner hereinbefore described.

It is to be understood that the above-described arrangements are merely illustrative of the application of the principles of the invention. Numerous other arrangements may be devised by those skilled in the art without departing from the spirit and scope of the invention.

What is claimed is:

1. In a signal generator, an input circuit comprising a pair of wires, a first detection means operable in response to the presence of an input signal on one wire in said pair, a second detection means operable in response to the presence of an input signal on the second wire in said pair, a gate circuit, an oscillator for generating a signal of frequency F1 connected to said gate circuit, an oscillator for generating a signal of frequency F2 connected to said gate circuit, an oscillator for generating a signal of frequency F3 connected to said gate circuit, an output circuit, means including said gate circuit operable in response to the operation of said first detection means to apply a resultant signal of frequencies F1 and F3 to said output circuit, and further means including said gate circuit operable in response to the operation of said second detection means to apply a resultant signal of frequencies F2 and F3 to said output circuit.

2. In a signal generator, an input circuit; means for applying *n* different input signals, one at a time, to said input circuit; *n* detection means each of which is associated with an individual input signal and is operable in response to the application of its associated signal to said input circuit, *n* oscillators each of which has a different frequency and each of which is individually associated with a particular detection means, an output circuit, means operable in response to the operation of any detection means to apply the signal from its related oscillator to said output circuit.

3. In a communication system, a signal generator having an input circuit comprising a pair of wires, a first detection means operable in response to the presence of an input signal on one wire in said pair, a second detection means operable in response to the presence of an input signal on the second wire in said pair, a gate circuit, an oscillator for generating a signal of frequency F1 connected to said gate circuit, an oscillator for generating a signal of frequency F2 connected to said gate circuit, an oscillator for generating a signal of frequency F3 connected to said gate circuit, an output circuit, means including said gate circuit operable in response to the operation of said first detection means to apply a resultant signal of frequencies F1 and F3 to said output circuit, and further means including said gate circuit operable in response to the operation of said second detection means to apply a resultant signal of frequencies F2 and F3 to said output circuit, a transmitter, a communication path, means for applying the resultant output signal from said gate circuit to said transmitter, means at said transmitter for converting said resultant signal to a modulated radio frequency signal and for applying said modulated signal to said communication path, a receiver located at a distance from said transmitter and interconnected therewith by said communication path, a telephone line extending from said receiver to called subscriber subsets, means at said carrier receiver for demodulating said modulated radio frequency signal and for applying the resultant signal to said telephone line.

4. In a communication system, a central office, a first and a second called subscriber subsets, a signal generator having an input circuit comprising a pair of wires, means in said central office responsive to the initiation of a call intended for said first called subscriber subset to apply a signal to a first wire in said pair of wires, means in said central office responsive to the initiation of a call intended for said second subscriber subset to apply a signal to a second wire in said pair of wires, a first detection means operable in response to the presence of an input signal on one wire in said pair, a second detection means operable in response to the presence of an input signal on the second wire in said pair, a gate circuit, a first oscillator for generating a signal of frequency F1 connected to said gate circuit, a second oscillator for generating a signal of frequency F2 connected to said gate circuit, an oscillator for generating a signal of frequency F3 connected to said gate circuit, an output circuit, means operable in response to the operation of said first detection means to apply a resultant signal of frequencies F1 and F3 to said output circuit, and further means operable in response to the operation of said second detection means to apply a resultant signal of frequencies F2 and F3 to said output circuit, a carrier frequency transmitter, means for applying the resultant signal from said output circuit to said transmitter, a transmission medium, means at said carrier transmitter for converting said resultant signal to a modulated radio frequency signal and for applying said modulated radio frequency signal to said transmission medium, a carrier receiver interconnected with said carrier transmitter by said medium, a telephone line extending from said receiver to both said first and second called subscriber subsets, means at said carrier receiver for demodulating said modulated radio frequency signal received over said transmission medium and for applying the resultant signal to said telephone line, and means in said first called subscriber subset for generating an audio frequency tone in response to the application of a resultant signal of frequencies F1 and F3 to said telephone line, and means in said second called subscriber subset for generating an audio frequency tone in response to the application of a resultant signal of frequencies F1 and F3 to said telephone line.

5. In a communication system, a signal generator having an input circuit; means for applying $n$ different input signals, one at a time, to said input circuit; $n$ detection means each of which is associated with an individual input signal and is operable in response to the application of its associated signal to said input circuit, $n$ oscillators each of which has a different frequency and each of which is individually associated with a particular detection means, an output circuit, means operable in response to the operation of any detection means to apply the signal from its related oscillator to said output circuit, a transmitter, a communication path, means for applying the output signal from said output circuit to said transmitter, means at said transmitter for convertaing said output signal to a modulated radio frequency signal and for applying said modulated signal to said communication path, a receiver located at a distance from said transmitter and interconnected therewith by said communication path, a telephone line extending from said receiver to called subscriber subsets, means at said carrier receiver for demodulating said modulated radio frequency signal and for applying said output signal to said telephone line.

6. In a communication system, a central office, $n$ called subscriber subsets, a signal generator having an input circuit, means in said central office responsive to the initiation of a call intended for any one of said called subscriber subsets to apply a signal unique to said one called subscriber subset to said input circuit, $n$ detection means each of which is associated with an individual input signal and is operable in response to the application of its associated signal to said input circuit, $n$ oscillators each of which has a different frequency and each of which is individually associated with a particular detection means and with a particular called subscriber subset, an output circuit, means operable in response to the operation of any detection means to apply the signal from its related oscillator to said output circuit, a transmitter, means for applying the signal from said output circuit to said transmitter, a transmission medium, means at said transmitter for converting said applied signal to a modulated radio frequency signal and for applying said modulated radio frequency signal to said transmission medium, a carrier receiver interconnected with said transmitter by said medium, a telephone line extending from said receiver to said $n$ number of called subscriber subsets, means at said carrier receiver for demodulating said modulated radio frequency signal received over said transmission medium and for applying the demodulated signal to said telephone line, and frequency selective means in each of said subsets for generating an audio frequency tone only in response to the application of its associated oscillator's signal to said telephone line.

References Cited in the file of this patent

UNITED STATES PATENTS

| | | |
|---|---|---|
| 2,202,474 | Vroom | May 28, 1940 |
| 2,604,544 | Dillon et al. | July 22, 1952 |